Nov. 11, 1930.        J. R. WILLIAMS        1,780,960
DAMPER CONTROL FOR HOUSE HEATING SYSTEMS
Filed June 8, 1928        2 Sheets-Sheet 1

Inventor
James R. Williams
by Parks & Carter
Attorneys.

Nov. 11, 1930.  J. R. WILLIAMS  1,780,960
DAMPER CONTROL FOR HOUSE HEATING SYSTEMS
Filed June 8, 1928   2 Sheets-Sheet 2
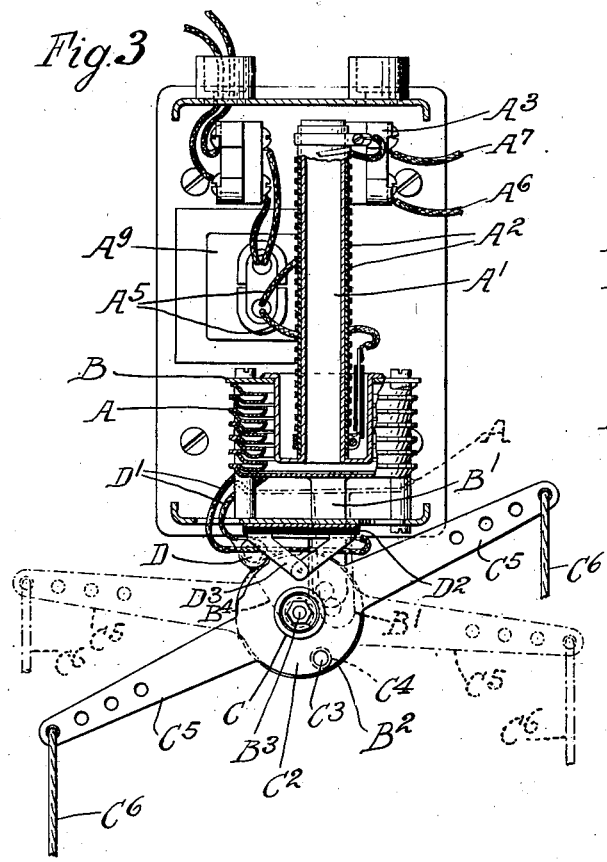
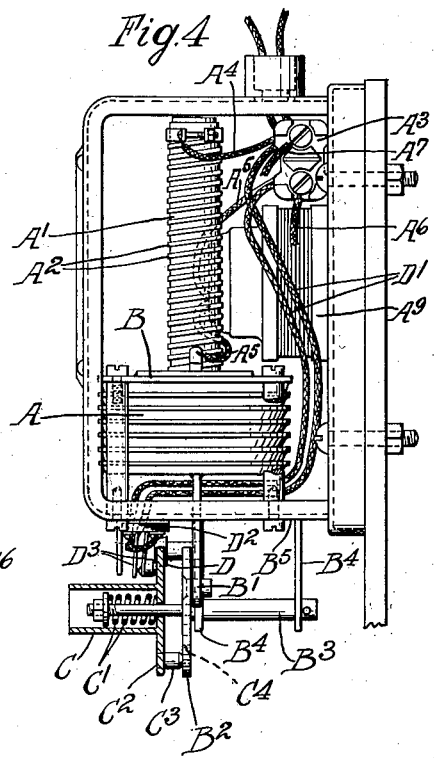
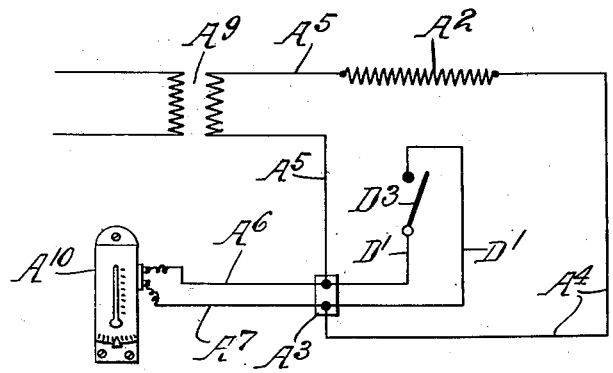
Inventor
James R. Williams
by Parks & Carts
Attorneys.

Patented Nov. 11, 1930

1,780,960

UNITED STATES PATENT OFFICE

JAMES R. WILLIAMS, OF QUINCY, ILLINOIS, ASSIGNOR TO H. M. SHEER COMPANY, OF QUINCY, ILLINOIS, A CORPORATION OF ILLINOIS

DAMPER CONTROL FOR HOUSE-HEATING SYSTEMS

Application filed June 8, 1928. Serial No. 283,790.

My invention relates to improvements in damper controls for house heating systems and the like and has for one object to provide in connection with a thermostatically controlled or automatic damper operating motor or mechanism, means whereby an operator working on the furnace at a point removed from the automatic control may manipulate the damper operating mechanism in such manner as to permit closing of the dampers for coaling of the furnace without change in the balance of the apparatus and whereby such control will automatically throw back into normal operation after a predetermined interval. Other objects of my invention will appear from time to time throughout the specification and claims.

My invention is illustrated more or less diagrammatically in the accompanying drawings, wherein—

Figure 3 is a section along the line 3—3 of Figure 2;

Figure 4 is a side elevation of the device in the temporarily changed position;

Figure 5 is a wiring diagram.

Like parts are indicated by like characters throughout the specification and drawings.

Figure 1:
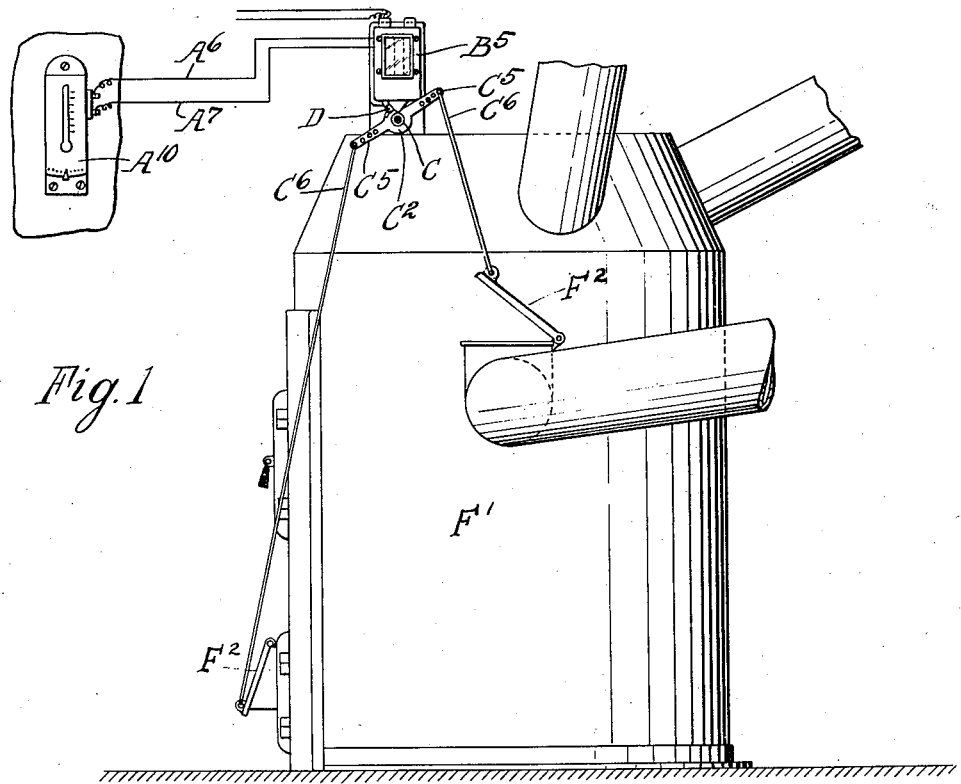
Figure 1 is a front elevation of my device as applied to a furnace.
Figure 2:
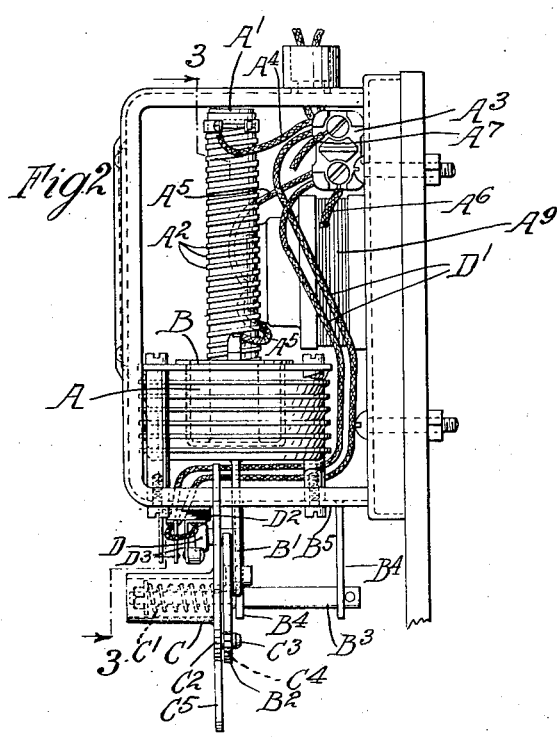
Figure 2 is a side elevation of the device in normal working position.

A is a closed bellows containing gas. $A^1$ is a cast reservoir communicating with the bellows, $A^2$ an electric heating coil surrounding the reservoir. $A^3$ is a junction box. $A^4$ $A^5$ are wires leading from ends of the coil to the junction box, the line $A^5$ being energized by means of the transformer $A^9$. $A^6$ $A^7$ are wires leading from the junction box to a thermostat $A^{10}$ which is located in a part of the house remote from the bellows.

It will be noted that the bellows is anchored at one end on the frame B, the other end of the bellows having a connecting rod $B^1$ pivoted on a crank plate $B^2$ on the pivot axle $B^3$ mounted for rotation in a bracket $B^4$ projecting downwardly from the housing $B^5$ which contains the entire apparatus. It will be understood that when the coil is energized, the gas within the bellows is heated, the bellows expands, rotates the crank disc in a clockwise direction. When the current is turned off the coil, the gas contracts, the bellows collapses, rotates the crank disc in a counter-clockwise direction. It is for the purpose of operating the dampers in the furnace responsive to variation in temperature in the house heated by the furnace in the well-known manner.

Slidable on the pivot axle $B^3$ is a sleeve C. This sleeve contains a spring $C^1$ tending to thrust the sleeve and the hub $C^2$ carried thereby laterally against the face of the crank disc. $C^3$ is a clutch pin carried by the hub $C^2$ adapted normally to penetrate a clutch hole $C^4$ in the crank disc $B^2$ but so positioned that when the hub is withdrawn bringing the pin out of register with the hole, the hub may be rotated with respect to the crank disc. $C^5$ $C^5$ are arms projecting laterally from the hub and $C^6$ are cables extending from such arms to the dampers of the furnace. As long as the pin and hole are in engagement, these arms will be rotated responsive to the movement of the bellows or vapor motor which in turn operates responsive to temperature conditions in the house. When, however, the fireman wishes to fire the furnace, if the dampers are open he wants to close them for the time during which firing is taking place, he does this by withdrawing the hub forwardly away from the crank plate, disengaging the pin and hole and rotating the hub and arms independent of the vapor motor controlled crank disc into the correct position.

Having done this the operator will, of course, go away and forget to throw the system back into operation, thus the movement of the vapor motor controlled by temperature variation will no longer affect the furnace. However, the stop D is provided in the path of the hub to limit its movement to a range less than the maximum movement of the motor so that if means are provided to cause the motor to operate, it will gradually rotate the crank disc until the hole in the disc comes in register with the pin when the pin will snap back into place and the motor will automatically resume control of the dampers. This is accomplished by providing in connection with the junction box the conductors D¹ which lead from the junction box to the switch panel D² where the make and break switch D³ is located adapted to be operated by the withdrawal of the hub from contact with the crank disc. When the operator disengages the hub from the disc, he closes the switch and short circuits the room control apparatus so as to insure a gradual though fairly rapid heating up of the gas in the motor to insure that the crank disc will be rotated far enough to take charge of the damper control with a minimum of delay. As soon as this happens and the hub drops back into register with the plate, the switch is opened, the short circuit is broken and the operator goes on subject only to the automatic control of the thermostat in the house.

For purposes of illustration, I have shown a diagrammatic view of an installation. A¹⁰ is the thermostat. I have shown it located in a room and subject to room temperature variation. Obviously the thermostat might take any form and be located at any point. F¹ is the furnace. It has dampers F² with the chain or cable C⁶ leading to the actuator arm.

I claim:

1. In combination a thermostat responsive to temperature, variation, a motor, the operation of which is controlled by the thermostat, a furnace, dampers controlling the furnace operation, an actuating member operated by the motor for controlling the dampers in response to the thermostat, means for temporarily disconnecting the motor and the damper actuating member to permit damper adjustment independent of the thermostat control and automatic means for connecting the motor and the actuating means, means independent of the thermostat for operating the motor during the time that the motor and the actuating means are disconnected.

2. In combination a thermostat responsive to temperature variation, a motor, the operation of which is controlled by the thermostat, a furnace, dampers controlling the furnace operation, an actuating member operated by the motor for controlling the dampers in response to the thermostat, means for temporarily disconnecting the motor and the damper actuating member to permit damper adjustment independent of the thermostat control and automatic means for connecting the motor and the actuating means, means independent of the thermostat for operating the motor during the time that the motor and the actuating means are disconnected, said means being adapted to operate the motor in the direction of the normal movement of the actuating means upon their disconnection from the motor.

3. In combination a thermostat responsive to temperature variation, a motor, the operation of which is controlled by the thermostat, a furnace, dampers controlling the furnace operation, an actuating member operated by the motor for controlling the dampers in response to the thermostat, means for temporarily disconnecting the motor and the damper actuating member to permit damper adjustment independent of the thermostat control and automatic means for connecting the motor and the actuating means, means independent of the thermostat for operating the motor during the time that the motor and the actuating means are disconnected and means operative after the motor and the actuating means are again connected for throwing the auxiliary motor operating means out of commission.

4. In combination, a thermostat responsive to temperature variation, a vapor motor adapted to be heated responsive to the thermostat, a furnace, dampers therefor, a damper actuating member adapted to be operated by the motor to control the dampers, means for disconnecting the motor and the actuating member to permit manual adjustment of the dampers independent of the thermostat and means for automatically reconnecting the motor and the actuating member after a predetermined period to cause the thermostat to resume control of the damper, a switch adapted to be automatically closed by the actuating member when it is disconnected from the motor to cause heating of the vapor motor whereby the motor is moved into engagement with the actuating member.

5. In combination, a thermostat responsive to temperature variation, a vapor motor adapted to be heated responsive to the thermostat, a furnace, dampers therefor, a damper actuating member adapted to be operated by the motor to control the dampers, means for disconnecting the motor and the actuating member to permit manual adjustment of the dampers independent of the thermostat and means for automatically reconnecting the motor and the actuating member after a predetermined period to cause the thermostat to resume control of the damper, including a switch adapted to be automatically closed by the actuating member when it is disconnected from the motor to cause heating of the vapor motor whereby the motor is moved into engagement with the actuating member, and yielding means for throwing the motor and the actuating member into engagement after a predetermined motor excursion.

6. In combination, a thermostat responsive to temperature variation, a vapor motor adapted to be heated responsive to the thermostat, a furnace, dampers therefor, a damper actuating member adapted to be operated by the motor to control the dampers, means for disconnecting the motor and the actuating member to permit manual adjustment of the dampers independent of the thermostat and means for automatically reconnecting the motor and the actuating member after a predetermined period to cause the thermostat to resume control of the damper, including a switch adapted to be automatically closed by the actuating member when it is disconnected from the motor to cause heating of the vapor motor whereby the motor is moved into engagement with the actuating member, and yielding means for throwing the motor and the actuating member into engagement after a predetermined motor excursion, the switch being adapted to be opened when the actuating member and motor return to engagement to cease the auxiliary heating of the motor.

7. In combination with a vapor motor having a heating coil to cause operation thereof, a rotary disc operated by the motor, an actuating member interlocking therewith, means for laterally displacing the actuating member to break the interlock between it and the disc.

8. In combination with a vapor motor having a heating coil to cause operation thereof, a rotary disc operated by the motor, an actuating member interlocking therewith, means for laterally displacing the actuating member to break the interlock between it and the disc, a stop limiting the rotary movement of the actuating member, a switch adapted to be closed when the actuating member is disengaged from the disc to close a heating circuit through the motor to cause rotation of the disc in the direction previously taken by the actuating member upon disconnection from the disc.

9. In combination with a vapor motor having a heating coil to cause operation thereof, a rotary member operated by the motor, an actuating member interlocking therewith, means for laterally displacing the actuating member to break the interlock between it and the disc, a stop limiting the rotary movement of the actuating member, a switch adapted to be closed when the actuating member is disengaged from the disc to close a heating circuit through the motor to cause rotation of the disc in the direction previously taken by the actuating member upon disconnection from the disc, yielding means to automatically return the actuating member and rotary member to interlocking position during the forward excursion of the motor.

10. In combination a thermostat responsive to temperature variation, a motor, the operation of which is controlled by the thermostat, a furnace, dampers controlling furnace operation, an actuating member operated by the motor for controlling the dampers in response to the thermostat and means for temporarily discontinuing the control of the thermostat over the dampers and for automatically after a predetermined interval resuming such control including means independent of the thermostat for operating the motor, during the time that the control of the thermostat over the dampers is discontinued.

11. In combination a thermostat responsive to temperature variation, a motor, the operation of which is controlled by the thermostat, a furnace, dampers controlling furnace operation, an actuating member operated by the motor for controlling the dampers in response to the thermostat and means independent of the control of the thermostat for moving the dampers to a selected position and means independent of the thermostat for operating the motor, during the time that the control of the thermostat over the dampers is discontinued.

12. In combination a thermostat responsive to temperature variation, a motor, the operation of which is controlled by the thermostat, a furnace, dampers controlling furnace operation, an actuating member operated by the motor for controlling the dampers in response to the thermostat, means independent of the control of the thermostat for moving the dampers to a selected position and means operative after a predetermined time interval for returning the dampers to the position from which they were moved including means independent of the thermostat for operating the motor, during the time that the control of the thermostat over the dampers is discontinued.

13. In combination a thermostat responsive to temperature variation, a motor, the operation of which is controlled by the thermostat, a furnace, dampers controlling furnace operation, an actuating member operated by the motor for controlling the dampers in response to the thermostat for moving the dampers to a selected position, means operative to temporarily discontinue the control of the thermostat over the dampers and means independent of the thermostat for operating the motor, during the time that the control of the thermostat over the dampers is discontinued.

14. In combination a thermostat responsive to temperature variation, a motor, the operation of which is controlled by the thermostat, a furnace, dampers controlling furnace operation, an actuating member operated by the motor for controlling the dampers in response to the thermostat for moving the dampers to a selected position, means operative to temporarily discontinue the control of the thermostat over the dampers, automatic means for returning after a predetermined interval the dampers to the control of the thermostat including means independent of the thermostat for operating the motor, during the time that the control of the thermostat over the dampers is discontinued.

15. The combination with a heater, of an electrically operated controller therefor comprising an expansible and contractible fluid containing member, a lever actuated thereby and controlling the combustion in said heater, an electric heater acting on the fluid in said member for moving said lever to on and off positions, a thermostat for controlling said electric heater, means for disconnecting said lever from said controller whereby to move it to a position intermediate on and off positions, and a switch in circuit with said electric heater, said switch being closed upon movement of said lever to intermediate position.

16. In combination, a thermostat responsive to room temperature variation, a motor, means for controlling the operation of the motor in response to actuation of the thermostat, a furnace, a damper controlling the furnace operation, and an actuating connection between said motor and said damper, including a rotatably mounted member, adapted to be driven by the motor and a control lever mounted concentrically therewith, connecting means for holding said lever normally against movement in relation to the control member, means for temporarily disconnecting said member and lever, and automatic means for rendering said connecting means again effective after a predetermined period.

17. In combination, a thermostat responsive to room temperature variation, a motor, means for controlling the operation of the motor in response to actuation of the thermostat, a furnace, a damper controlling the furnace operation, and an actuating connection between said motor and said damper, including a movably mounted member and a constantly effective driving connection between said member and the motor, and a control lever mounted adjacent said movable member, means for normally maintaining said member and control lever held against relative movement, means for temporarily disconnecting said lever from said member, to permit said lever to move in relation to said member, and automatic means for returning said lever to non-moving relationship with said member after a predetermined period.

18. In combination, a thermostat responsive to room temperature variation, a motor, means for controlling the operation of the motor in response to actuation of the thermostat, a furnace, a damper controlling the furnace operation, and an actuating connection between said motor and said damper, including a movably mounted member and a constantly effective driving connection between said member and the motor, and a work-performing member interlocking with said movably mounted member, and means for laterally displacing the work-performing member to break the interlock between it and the movably mounted member, and automatic means for returning said work-performing member to interlocking relationship with the movable member after a predetermined period.

Signed at Quincy, county of Adams, and State of Illinois, this 18th day of May, 1928.

JAMES R. WILLIAMS.